March 16, 1971     J. ORTHEIL     3,570,832

HYDRO-PNEUMATIC SPRING CYLINDER FOR VEHICLES

Filed Oct. 8, 1968     2 Sheets-Sheet 1

INVENTOR
JOHANNES ORTHEIL

BY Glascock, Downing & Seebold

ATTORNEYS

United States Patent Office 3,570,832
Patented Mar. 16, 1971

3,570,832
HYDRO-PNEUMATIC SPRING CYLINDER FOR VEHICLES
Johannes Ortheil, 10 Allee, 4151 Anrath, Germany
Filed Oct. 8, 1968, Ser. No. 765,862
Int. Cl. B60g *13/08*
U.S. Cl. 267—64
11 Claims

ABSTRACT OF THE DISCLOSURE

A hydro-pneumatic spring cylinder containing a level regulating device which maintains the height of the car above the wheels constant by a slide valve which controls the pressure fluid contained therein in which the slide valve is a 3/3 way slide valve which connects a piston chamber with a pressure source in one regulating position and a piston chamber with a discharge line in another regulating position and which blocks this position in a neutral position.

BACKGROUND OF THE INVENTION

The invention relates to a hydro-pneumatic spring cylinder for vehicles containing a level regulating device arranged inside the cylinder housing, which maintains the height of the car body above the wheels and axles constant by means of a slide valve controlling the pressure fluid, independent of the vehicle load.

A servo-cylinder has been previously suggested (French Pat. No. 1,016,797) wherein a control slide valve passes through the cylinder bottom and a part of the piston thereby controlling the outflow of the pressure medium from the piston chamber in cooperation with control bores. This arrangement suffers from the disadvantage that a constant fluid circulation must be maintained. If such a cylinder was used in a vehicle suspension, it would lead to an undesirably high fluid consumption. This consumption would be further increased by vibrations of the cylinder due to unevennesses of the road travelled, since large cross section would be built up by these sudden vibrations acting on the level regulating device. In other situations, feedback vibrations might also arise, in addition to the high fluid consumption.

The object of the invention is therefore to avoid these disadvantages and to achieve a more economical and stable operation of the level regulating device without having to forego a compact and closed construction.

SUMMARY OF THE INVENTION

This problem is solved, according to the invention, in that the slide valve arranged in the cylinder housing is designed in a known manner as a 3/3 way slide valve which connects the piston chamber with a pressure source in a first regulating position and the piston chamber with the discharge in a second regulating position and blocks this connection in a neutral position, with the slide valve being actuated during a certain stroke length of the piston by the latter over a spring and actuated in an opposite direction by a constantly acting additional force. This additional force can be produced, for example, by a spring bearing on the cylinder housing. The slide valve is preferably designed as a stepped piston, with the resulting annulus as well as the spring chamber being connected with the piston chamber through restrictors. In another embodiment, the annulus can also be connected with the discharge. The power admission of the slide valve is then effected by hydraulic means.

The main advantage of the spring cylinder according to the invention is that only static load changes lead to a response in the cylinder. The fluid consumptions remain low, since it is only necessary to refill in cases where a load increase results in leakage of the oil. It is thus possible to install a hydro-accumulator in the fluid circuit and to switch the pump over a shut-off valve temporarily to a pressure-free circulation. Other advantages and features will be apparent from the following description and the drawing:

DETAILED DESCRIPTION OF THE INVENTION

Figure 1:
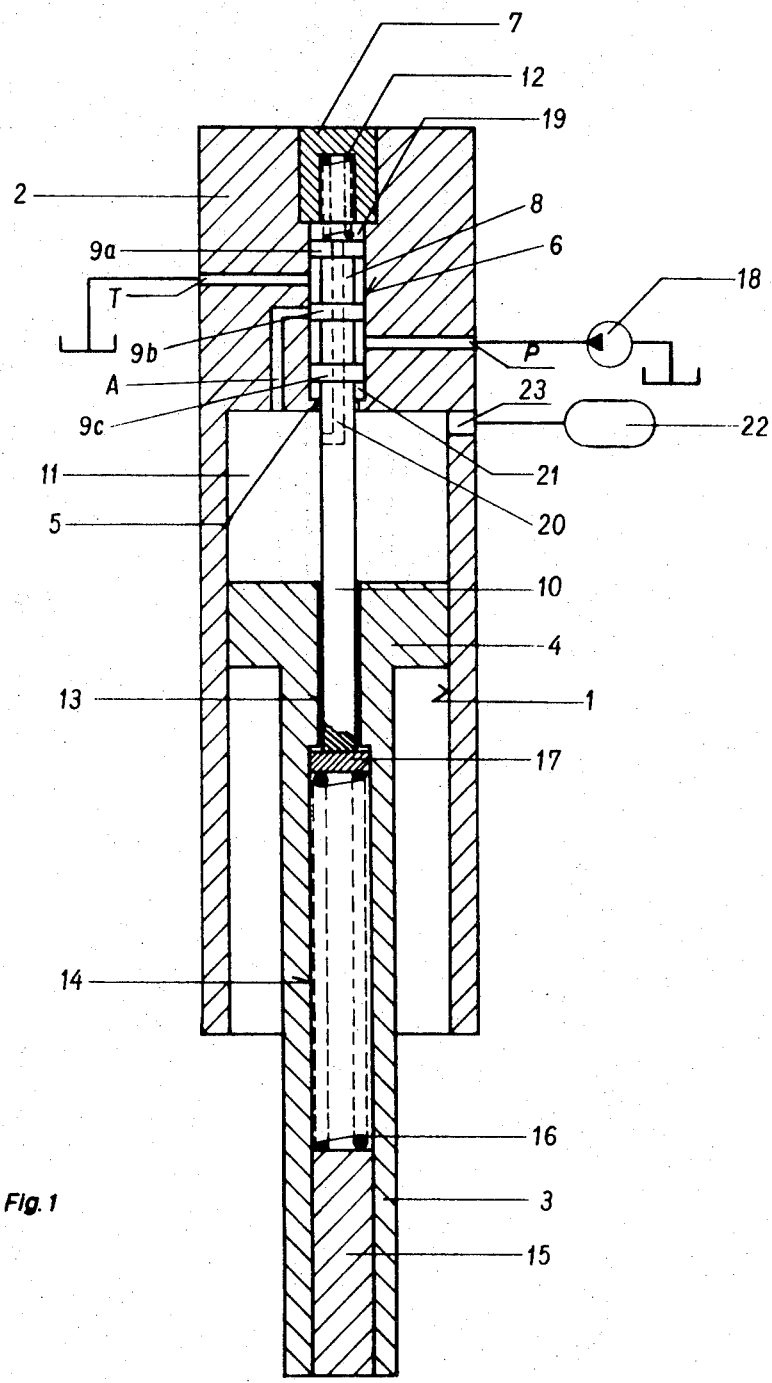
FIG. 1 shows schematically an embodiment according to the invention with a spring-loaded slide valve.

In a bore 1 of a cylinder housing 2, a piston 4 provided with a piston rod 3 slides in a liquid-tight relationship. The bore 1 extends into a coaxial bore 5 which in turn widens to a bore 6 which is closed by a plug 7. In the bore 6 slides a slide valve 8 which has three axially spaced shoulders 9a, 9b and 9c, and an extension in the form of a rod 10, which passes through the bore 5 and extends into a piston chamber 11. The slide valve 8 is loaded on its upper end by a spring 12 which is biased between the plug 7 and the shoulder 9a. The rod 10 slides in the represented position in a bore 13 which extends axially of the piston 4 and the piston rod 3 respectively and which widens into a bore 14 closed by a plug 15. A spring 16 bears at one end against the plug 15 and the other end against a spring washer 17 on the rod 10. In the represented neutral position, a duct A leading to the piston chamber 11 is closed by the shoulder 9b. Another line or duct P terminating between the shoulders 9b and 9c is connected with a pump 18, while a discharge line or duct T terminates between the shoulders 9a and 9b. A spring chamber 19 is connected through a throttle bore 20 in the valve 8 with the piston chamber 11. An annulus 21 is in communication with the piston chamber 11 through the annular gap between the rod 10 and bore 5. A hydro-accumulator 22 having a constant gas volume is used as a spring element, and the accumulator is connected through a line or duct 23 with the piston chamber 11.

Figure 2:
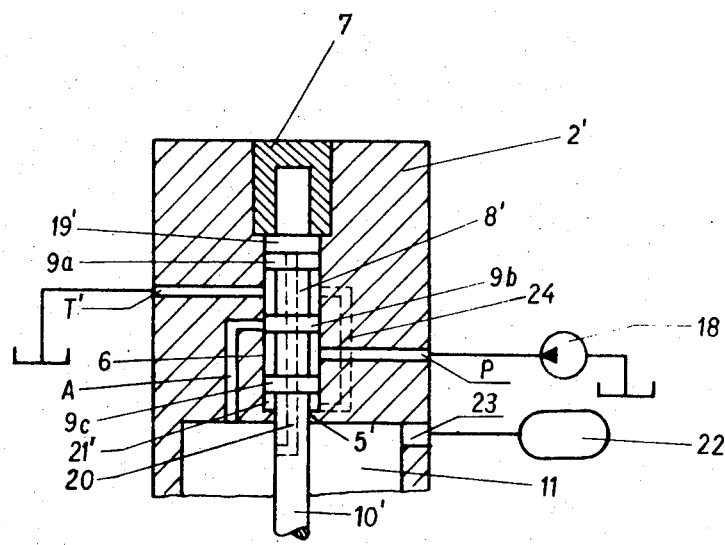
FIG. 2 shows a slide valve actuated by hydraulic means.

In FIG. 2, the slide valve 8' slides in a cylinder housing 2'. The annulus 21' is now connected with a discharge T' through a line 24. The rod 10' is guided in a liquid-tight relationship in the bore 5'.

The method of operation is as follows:

Assuming that the vehicle is relieved by a certain amount, the pressure on the fluid diminishes and fluid is displaced from the hydro-accumulator 22 into the piston chamber 11, which is thus increased in volume and moves the piston 4 downwardly. The slide valve 8 remains at first clamped between the springs 16 and 12 and performs a downward movement only when the force of the spring 12 exceeds that of the spring 16. This is the case when the spring washer 17 strikes against the shoulder between the bores 13 and 14 and the rod 10 is disengaged in a further downward movement of piston 4. The slide valve 8 is then urged by the spring 12 into an end position which is determined by the shoulder between the bores 5 and 6. In the end position, the piston chamber 11 is connected through the lines A and T as well as the bore 6 with the discharge. Fluid then flows from piston chamber 11 to the discharge, the piston 4 moves again into the cylinder housing 2, and the rod 10 again strikes spring washer 17. Assuming that the residual stress of the spring 16 is about equal to the residual stress of the spring 12 in the lower end position of the slide valve 8, and the firmness of the spring 16 is greater than that of the spring 12, there is again obtained, after some time, the above represented neutral position. With a load increase, the piston 4 displaces fluid into the hydro-accumulator 22, due to the pressure increase. On its way over the spring 16 and rod 10, the slide valve 8 follows the movement of the piston 4 against the force of the spring 12 and establishes the connection P, 6, A. Pressurized fluid now flows into the piston chamber 11 and moves the piston 4 until the neutral position is reached.

In order to avoid movement of the slide valve in response to each unevenness of the road encountered, it is advisable to damp the movement of the slide valve. This is effected, for example, by the throttle bore 20, which connects the spring chamber 19 with the piston chamber 11 and prevents a rapid displacement of the fluid from the spring chamber 19. The response behavior of the level regulating device is determined substantially by the ratio of the spring firmness and residual stresses of the springs 12 and 16. It is possible to permit the spring 16 to act first when the slide valve 8 is at its upper stop. The connection between the piston 4 and rod 10 must be considered in this case as rigid within the stroke range of slide valve 8 and the response time will be very short. On the other hand, the spring action of the spring 16 can be softer so that an inward movement of the piston 4 is transmitted to a lesser extent to the slide valve 8. In the same manner, different levels can be adjusted by varying one or both residual stresses of the springs, since different positions of piston 4 then correspond them to different states of equilibrium between the forces of the springs 12 and 16.

In the embodiment according to FIG. 2, the actuation of slide valve 8' is effected by hydraulic means. The pressure in piston chamber 11' propagates through the throttle bore 20' into the chamber 19' on the top side of slide valve 8'. Since the annulus 21' is relieved through the bore 24, the annular surface becomes the effective surface. In order to keep the level independent of the load, it is advisable to make the residual stress of spring 16' greater than the maximum pressure acting on the annular surface. Spring 16' acts then as a rigid transmission element until side valve 8' strikes plug 7' under a static load.

The invention is not limited to the above represented embodiments. In particular, variations are possible with regard to the design of the slide valve and the arrangement of the springs; for example, tension springs may be used instead of the compression springs in the present example. The invention can also be applied to pistons actuated on both sides with fluid. The damping of the movement of the slide valve could be varied, for example, by a throttle relief valve in the bore 20.

I claim:

1. A hydro-pneumatic spring cylinder for use with a wheeled vehicle for maintaining the height of the vehicle chassis above the wheels and axle constant, including a cylinder having a head portion, a piston and piston rod slidable in the cylinder and defining a piston chamber between the piston and the head portion, said head portion having a bore of lesser diameter than that of the piston chamber communicating with the piston chamber, said head portion having a first duct leading from said bore to said piston chamber, a second duct leading from said bore to a fluid pressure source, and a third duct leading from said bore to a discharge, a slide valve located in said bore with the sliding movement of said valve opening and closing said ducts, first spring means biased between the head portion and the slide valve, second spring means biased between the piston rod and the slide valve, with said slide valve in the neutral position closing said first duct and providing communication between the pressure fluid source and said bore and said discharge and said bore, a hydro-accumulator, and means providing communication between the hydro-accumulator and the piston chamber, the arrangement being such upon relieving pressure on the pressure fluid in the piston chamber, fluid is displaced from the hydro-accumulator into the piston chamber thereby moving the piston away from the head portion increasing the volume of the piston chamber and upon the force of the first spring means exceeding that of the second spring means, the valve moves towards the piston chamber to provide communication between the piston chamber and discharge via the first duct, the bore, and the third duct and upon a load increase, the piston displaces fluid into the hydro-accumulator with the second spring means displacing the valve away from the piston chamber to provide communication between the pressure fluid source and piston chamber via the second duct, the bore and the first duct whereby pressurized fluid flowing into the piston chamber moves the piston until the neutral position is reached.

2. The hydro-pneumatic spring cylinder according to claim 1 characterized in that said first spring means is prestressed.

3. The hydro-pneumatic spring cylinder according to claim 1, characterized in that the slide valve is provided with axially spaced shoulders.

4. The hydro-pneumatic spring cylinder according to claim 1, characterized in that the slide valve is limited in its stroke by stops.

5. The hydro-pneumatic spring cylinder according to claim 1, characterized in that an annular space in the bore is connected with the piston chamber through a throttle gap between the slide valve and bore.

6. The hydro-pneumatic spring cylinder according to claim 1 is characterized in that the chamber is connected with the piston chamber through a throttle bore.

7. The hydro-pneumatic spring cylinder according to claim 1, characterized in that the second spring means is arranged in a bore of the piston rod.

8. The hydro-pneumatic spring cylinder according to claim 1, characterized in that the spring means is prestressed between stops and a shoulder.

9. The hydro-pneumatic spring cylinder according to claim 1, characterized in that the residual stresses of the spring means are adjustable.

10. The hydro-pneumatic spring cylinder according to claim 1, characterized in that the slide valve and spring means are arranged coaxially with respect to the bore.

11. The hydro-pneumatic spring cylinder according to claim 1, characterized in that an annular space in the bore is connected with the discharge through a separate duct leading to the bore.

References Cited

UNITED STATES PATENTS

| | | | |
|---|---|---|---|
| 3,140,084 | 7/1964 | Schmidt | 267—64 |
| 3,366,378 | 1/1968 | Sons, Jr. | 267—64 |

JAMES B. MARBERT, Primary Examiner